United States Patent
Groszek et al.

[15] 3,666,689

[45] May 30, 1972

[54] SOLID COMPOSITIONS

[72] Inventors: Aleksander Jerzy Groszek; Rodney Ernest Witheridge, both of London, England

[73] Assignee: The British Petroleum Company Limited, London, England

[22] Filed: Mar. 28, 1969

[21] Appl. No.: 811,644

[30] Foreign Application Priority Data

Apr. 2, 1968 Great Britain.....................15,721/68

[52] U.S. Cl..............................................252/512, 252/513
[51] Int. Cl. ..........................................................H01b 1/02
[58] Field of Search..........................................252/512–514

[56] References Cited
UNITED STATES PATENTS

2,947,646  8/1960  Devaney et al. ......................252/514
3,003,975  10/1961  Louis......................................252/513
3,014,818  12/1961  Campbell...............................252/513
3,491,056  1/1970  Suanders et al.......................252/513

*Primary Examiner*—Douglas J. Drummond
*Attorney*—Morgan, Finnegan, Durham & Pine

[57] ABSTRACT

Polymeric compositions based on, e.g., polyethylene or poly vinyl chloride containing ultra-fine metal flakes produced by grinding metals in an organic liquid are electrically conductive. The specific resistance can be decreased in some cases to less than $10^{-1}$ ohm. cm.

5 Claims, No Drawings

SOLID COMPOSITIONS

This invention relates to reinforced plastics materials, more particularly to plastics materials reinforced by finely divided metals.

As metals are generally much harder and stronger than almost all plastics materials, many attempts have been made to reinforce plastics materials with metal powders. However, the conventional ways of producing fine metal particles, e.g., vapor condensation, tend to produce spherical particles which have poor affinity for each other and for the plastics material.

For some applications it is desirable to produce plastics compositions which can conduct electricity, this has been achieved by the use of relatively large amounts of specially prepared carbon blacks or carbon fibers.

However, carbon has a negative temperature coefficient of resistance which can mean, in some circumstances, that if a current bearing material started to over-heat the cocatenating effect could rapidly lead to a burn out. Metal filled plastics do not suffer from this defect.

For some applications, plastics materials which have magnetic properties are required, and satisfactory products have been achieved only by incorporating magnetic oxides, such as ferrites, in the plastics material.

We have now found that finely divided metals can be incorporated in plastics materials which can render the composition electrically conductive. When the metals are ferro-magnetic, the plastic composition containing them is also rendered susceptible to magnetic fields.

According to the invention there is provided a composition comprising a plastics material containing dispersed therein a finely divided metal which has a surface area of at least 1 square meter per gram and a bulk density of less than 1 gram per cc. Preferably the metal has a surface energy measured by the adsorption of n-butanol of at least 0.01 calorie per gram.

Preferably the finely divided metals have a heat of adsorption of n-butanol of at least 0.05 calorie per gram, a surface area of at least 2 square meters per gram and a bulk density of less than 0.5 gram per cc. More preferably they have a heat of adsorption with n-butanol of at least 0.5 calorie per gram. In some cases adsorption heats of more than 10 calories per gram and as high as 100 calories per gram can be obtained.

Suitable metals which can be used in the present invention are the metals of group 1B,2B, 3,4 and 5 of the Periodic Table of Elements and the transition metals. The most preferred metals are iron, aluminum, copper, zinc, tin and lead and alloys thereof such as brass and steel.

The metals are preferably present in the compositions of the present invention in amounts of 1–95 percent by weight and more preferably 5–90 percent by weight. The larger the amounts of finely divided metal present in the invention the better the electrical conductivity of the plastics composition.

The compositions of the present invention preferably have a specific resistivity of less than 25 ohm-cm, more preferably less than 10 ohm-cm and most preferably less than 5 ohm-cm.

The heat of adsorption of the metals can be determined using the flow micro-calorimeter as described in Chemisty and Industry March 20, 1965 482–489, using n-butanol adsorbed from n-heptane.

Suitable plastics materials which can be used are polyolefins, such as polyethylene and poly 4-methylpentene-1 and polypropylene, substituted polyolefins such as polyvinyl chloride, polyvinylacetate and polystyrene; polycarbonates; polyamides; polyurethanes; polyesters such as polyterephthaltes and polymethacrylates; polyacetals polyureas; polyethers, polyepoxy resins, phenolplasts such as phenol/formaldehyde resins and aminoplasts such as urea/formaldehyde and melamine/formaldehyde resins. The preferred plastics materials are thermoplastics such as polyolefins and polyvinyl chloride.

The finely divided metals useful in the present invention can be made by the methods disclosed in U.S. Pat. No. 3,476,325 and pending U.S. application, Ser. No. 794,757, filed Jan. 28, 1969.

These finely divided metals can be prepared by grinding a metal in an organic liquid in the presence of a load-carrying additive for lubricants and/or other grinding aid. Preferably a high energy mill such as a vibration ball mill of vibrational amplitude of at least 2 mm and a vibration frequency of at least 1,000 oscillations a minute is used.

The organic liquids used as the grinding medium should have a boiling point of less than 500° C and include hydrocarbons especially n-heptane, iso-octane, cyclohexane, toluene, hexadecane of a hydrocarbon fraction obtained by the distillation of petroleum. Other liquids which can be used include most volatile oxygen- halogen-, nitrogen-, and sulphur-containing liquids. Preferably the grinding liquids have a surface tension less than 72 dynes/cm more preferably less than 45 dynes/cm. The viscosity of the liquid at the grinding temperature must be sufficiently low to enable the grinding action to be sufficiently energetic to produce a metal power having the desired surface energy, surface area and bulk density. For this reason, liquids with a viscosity of less than 30 centistokes, more preferably less than 3 centistokes and most preferably less than 1 centistoke are preferred.

The grinding liquid can contain a conventional lubricating load-carrying additive. Lubricating load-carrying additives are usually compounds containing one or more elements of groups 5, 6 or 7 of the periodic table especially nitrogen, phosphorus, sulfur and chlorine. The grinding liquids may also contain a grinding aid such as a fatty alcohol, fatty acid or ester thereof either in addition to the load-carrying additive or in its place. In general the better the lubricating activity of the load-carrying additive or other grinding aid on the unground metal the more effective it will be in the grinding process. The preferred load-carrying additive is carbon tetra-chloride and the preferred fatty acids are stearic acid, palmitic acid or their vinyl esters. Cetyl alcohol may also be used.

It is important to disperse the finely divided metals homogeneously throughout the plastics material in order to obtain the most beneficial results.

The finely divided metals can be incorporated into the plastics material using the conventional blending techniques and equipment, for example ribbon-type blenders and internal mixers such as the Bridge-Banbury type can all be used. It is sometimes advantageous to disperse the finely divided metals in a solvent for the plastics material before adding the finely divided metals to the plastics material. A preferred mixing technique uses an ultra-sonic mixer.

The electrical conductivity of the composition can be improved by subjecting the compositions to compression, e.g., by hot rolling, to increase the contact between the metal particles.

The high surface energies of the finely divided metals and their flake-like shape causes the metal particles to have a strong affinity for each other and for the plastics material. If sufficient of the metal is present in the composition the metal particles can form a continuous "structure" of metal "flakes" in contact with each other, throughout the plastics material. It is thought that this structure is responsible for the electrical conductivity of the plastics material.

These preferred compositions are electrically and thermally conductive, and the conductivities can be varied by using a range of metals and alloys in a varying amount. When the finely divided metal is made from a ferromagnetic metal such as iron, then the plastics composition is rendered susceptible to magnetic fields.

It is very surprising that very low concentrations of metals can have a marked effect on electrical conductivity of the plastics compositions. It is especially surprising when the very low volume loading of the metal in the plastics is considered, in some cases the volume loading can be as low as 1 percent though preferably it is at least 5 percent.

In order to modify the properties of the plastics compositions conventional additives such as plasticizers, extenders and fillers may be added.

The composition of the present invention can be used as heating panels for space heating, anti-static floor coverings, and protective shielding sheaths for electric cables such as microphone leads.

The invention will be described with reference to the following example.

EXAMPLE

Steel and brass were ground in a "Megapact" vibratory ball mill below the surface of n-heptane containing 5 percent of stearic acid and 1 percent cetyl alcohol respectively. The grinding chambers of this mill were 1¼ inches in diameter by 15 inches long and were nearly filled with hard grade steel balls. The chambers were filled with n-heptane and between 25-30 grams of metal.

The mill was driven by a ⅛ horsepower motor and had an amplitude of vibration of 4 mm and a frequency of vibration of 3,000 cycles per minute. The slurry of metal particles were separated from the balls, and the metal particles separated by sieving.

The properties of the metal produced are shown in Table 1.

TABLE 1

| Metal | Surface area, m.²/grm. | Heat of adsorption, cals./grm. | Bulk density |
|---|---|---|---|
| Steel | 18 | 106 | 0.19 |
| Brass | 6 | 1.3 | 0.25 |

The surface energy was measured using a flow micro calorimeter as described in Chemistry and Industry March 25, 1965 pages 482–489 using n-butanol adsorbed from n-heptane. The grinding liquid adsorbed on the metal surface was not removed.

The metal powders were homogenously incorporated in polyethylene and polyvinyl chloride by dry milling and the compositions were compressed using warm rollers. The electrical resitivities were measured and the results shown in Table 2.

TABLE 2

| Metal powder | Plastics material | Percent wt. of metal in composition | Specific resistivity, ohm cm. |
|---|---|---|---|
| Steel | Polyvinyl chloride | 10 | 13.6 |
| Do | do | 20 | 2.8 |
| Brass | do | 60 | $1.9 \times 10^{-1}$ |
| Steel | Polyethylene | 20 | 1.9 |
| Do | do | 50 | $7.8 \times 10^{-1}$ |
| Brass | do | 60 | $5.3 \times 10^{-3}$ |

Two commercially available metal filled plastic compositions consisting of polyvinyl chloride containing 60 percent by weight of brass powder and polyethylene containing 50 percent steel powder were tested, and both had specific resistivities of greater than $10^5$ ohm-cm.

We claim:

1. An electrically conductive plastics composition which comprises 99 to 5 percent by weight of a polymeric plastics material having dispersed therein from 1 to 95 percent by weight of a finely divided metal having a surface area of at least 1 square meter per gram and a bulk density of less than 1 gram per cubic centimeter which finely divided metal is prepared by grinding a metal in an organic liquid in the presence of a grinding aid selected from load carrying additives for lubricants and fatty alcohols, fatty acids and esters thereof, in a grinding mill the chamber of which is filled with the said organic liquid.

2. A composition as claimed in claim 1 which has a specific resistivity of less than 25 ohm-cm.

3. A composition as claimed in claim 1 in which the said finely divided metal has a heat of adsorption of n-butanol of at least 0.01 calorie per gram.

4. A plastics composition as claimed in claim 1 having a specific resistivity of less than 25 ohm-cm. which comprises from 95 – 10 percent by weight of a thermoplastic material and from 5 to 90 percent by weight of a finely divided metal having a surface area of at least 2 square meters per gram, a bulk density of less than 0.5 gram per cubic centimeter and a heat of adsorption with n-butanol of at least 0.5 calorie per gram.

5. A composition as claimed in claim 4 in which the said thermoplastic material is selected from polyolefins and halogenated polyolefins.

* * * * *